US008315727B2

(12) United States Patent
Terada

(10) Patent No.: US 8,315,727 B2
(45) Date of Patent: Nov. 20, 2012

(54) CHANNEL PATCHING APPARATUS FOR NETWORK AUDIO SYSTEM

(75) Inventor: Kotaro Terada, Hamamatsu (JP)

(73) Assignee: Yamaha Corporation (JP)

( * ) Notice: Subject to any disclaimer, the term of this patent is extended or adjusted under 35 U.S.C. 154(b) by 1056 days.

(21) Appl. No.: 12/247,696

(22) Filed: Oct. 8, 2008

(65) Prior Publication Data

US 2009/0099672 A1 Apr. 16, 2009

(30) Foreign Application Priority Data

Oct. 10, 2007 (JP) ................................ 2007-263967

(51) Int. Cl.
*G06F 17/00* (2006.01)
*H04B 1/00* (2006.01)
*H02B 1/00* (2006.01)

(52) U.S. Cl. .......................... 700/94; 381/119; 381/123

(58) Field of Classification Search .................... 700/94; 381/80-81, 119, 123; 715/716, 727; 709/230-231
See application file for complete search history.

(56) References Cited

U.S. PATENT DOCUMENTS 5,703,794 A * 12/1997 Heddle et al. .................. 700/94
7,953,879 B1 * 5/2011 Nagaralu et al. .............. 709/231
2002/0156547 A1 * 10/2002 Suyama et al. ................. 700/94
2008/0226086 A1 * 9/2008 Kageyama et al. ........... 381/119
2009/0327698 A1 * 12/2009 Baker et al. .................. 709/231

OTHER PUBLICATIONS

"CSID Control Surface Operation Manual (Basic Operations)," Yamaha Corporation, 2002; pp. 33-35; cited in specification.

Staley S., "Euphonix SH612 Studio Hub User Guide Document Revision: 2.3", Euphonix, Jun. 1, 2006, pp. I-VI, 7-44, XP055017181. Cited in corresponding patent application EP08166093, dated Feb. 1, 2012. <http://connect.euphonix.com/documents/SH_OpMan_SF1612_Rev2_3.pdf>.

Rob Wenig et al., "Euphonix System 5 Digital Audio Mixing System Operation Manual", Euphonix, Jan. 1, 2006, pp. I-XVIII, 19-228, XP055017846. Cited in corresponding patent application EP08166093, dated Feb. 1, 2012. <http://connecteuphonix.com/documents/S5_OpMan_v2_9_Rev2_3.pdf>.

(Continued)

*Primary Examiner* — Jesse Elbin

(74) *Attorney, Agent, or Firm* — Rossi, Kimms & McDowell LLP

(57) ABSTRACT

In a channel patching apparatus, an output patch setting part assigns a name to an audio signal of an internal channel of an audio device, which outputs the audio signal to a transmission channel of an audio network. A transmission channel allocation setting part allocates a transmission channel of the audio network to the audio signal assigned the name, and performs setting of the audio device such that the audio signal assigned the name is output from an internal channel associated with the audio signal assigned the name to the allocated transmission channel. An input patch setting part assigns a name that the user has selected from a list of the names assigned to the audio signals, to an internal channel of an audio device of an input side, to which an audio signal from a transmission channel of the audio network is input, and performs setting of the audio device such that an audio signal of a transmission channel corresponding to the selected name is input to the internal channel of the audio device assigned the selected name.

3 Claims, 10 Drawing Sheets

OTHER PUBLICATIONS

Anonymous, “Grass Valley VM/SI 3000 System Controlls Jupiter LE JupiterPlus Installation and Operating Manual”, Thomas—Grass Valley, Jan. 29, 2007, pp. I-XXVI, 5_1-5_210, XP002668233. Cited in corresponding patent application EP08166093, dated Feb. 1, 2012. <http://www.grassvalley.com/docs/Manuals/routers/jupiter/071-8305-03.pdf>.

Rob Wenig et al., “Euphonix Max Air Operation Manual”, Euphonix, Sep. 1, 2005, pp. I-XVI, 17-188, XP055017847. Cited in corresponding patent application EP08166093, dated Feb. 1, 2012. <http://connecteuphonix.com/documents/MA_OpMan_v1_4_Rev1_4.pdf>.

European Search Report issued in corresponding patent application EP08166093, dated Feb. 1, 2012.

* cited by examiner

FIG. 3

OUTPUT PATCH (AD#1)

301, 302

| Ch | Name | Priority | System Bus | Bus Number |
|---|---|---|---|---|
| Out 1 | MC Main | 10 | ☑ | 25 |
| Out 2 | MC Sub | 10 | ☑ | 26 |
| Out 3 | Vocal Main | 10 | ☑ | 27 |
| Out 4 | Vocal Main | 9 | ☑ | 28 |
| Out 5 | Vocal Sub | 10 | ☐ | – |
| Out 6 | Vocal Sub | 9 | ☑ | 35 |
| Out 7 | AD#1 Out7 | 10 | ☑ | 36 |
| Out 8 | AD#1 Out8 | 10 | ☑ | 37 |
| ... | ... | | ☐ | ... |

OUTPUT PATCH (AD#2)

303, 304

| Ch | Name | Priority | System Bus | Bus Number |
|---|---|---|---|---|
| Out 1 | Guitar 1 | 10 | ☑ | 41 |
| Out 2 | Guitar 1 | 9 | ☑ | 42 |
| Out 3 | Guitar 2 | 10 | ☑ | 43 |
| Out 4 | Guitar 2 | 9 | ☑ | 44 |
| Out 5 | Keyboard 1 | 10 | ☑ | 45 |
| Out 6 | Keyboard 1 | 9 | ☑ | 46 |
| Out 7 | Keyboard 2 | 10 | ☑ | 47 |
| Out 8 | Keyboard 2 | 9 | ☑ | 48 |
| ... | ... | | ☐ | – |

CREATE LIST FROM OUTPUT CHANNEL NAMES

NAME IS "SET" AND SYSTEM BUS IS USED

INPUT PATCH (Console #1)

SELECT FROM LIST 312, 313

| Ch | Name | Bus Number |
|---|---|---|
| Ch 1 | MC Main | 25 |
| Ch 2 | MC Sub | 26 |
| Ch 3 | Vocal Main | 27 |
| Ch 4 | Vocal Sub | 35 |
| Ch 5 | Guitar 1 | 41 |
| Ch 6 | Guitar 2 | 43 |
| Ch 7 | Keyboard 1 | 45 |
| Ch 8 | Keyboard 2 | 47 |
| ... | ... | ... |

311

| |
|---|
| MC Main |
| MC Sub |
| Vocal Main |
| Vocal Sub |
| AD#1 Out7 |
| AD#1 Out8 |
| Guitar 1 |
| Guitar 2 |
| keyboard 1 |
| Keyboard 2 |
| ... |

310

| Name | Bus Number |
|---|---|
| MC Main | 25(10) |
| MC Sub | 26(10) |
| Vocal Main | 27(10),28(9) |
| Vocal Sub | 35(9) |
| AD#1 Out7 | 36(10) |
| AD#1 Out8 | 37(10) |
| Guitar 1 | 41(10),42(9) |
| Guitar 2 | 43(10),44(9) |
| keyboard 1 | 45(10),46(9) |
| Keyboard 2 | 47(10),48(9) |
| ... | ... |

CHANNEL PATCHING APPARATUS FOR NETWORK AUDIO SYSTEM

BACKGROUND OF THE INVENTION

1. Technical Field of the Invention

The present invention relates to a technology for patching channels of an audio network and channels of each audio device in a network audio system including a plurality of audio devices connected to the network.

2. Description of the Related Art

Conventionally, an audio system has been implemented by connecting a plurality of audio devices through an audio network through which an audio signal can be transmitted and received in real time and performing allocation (patching) of channels of each device and transmission channels of the audio network. The audio devices connected to the audio network include a device for inputting an audio signal, a device for performing signal processing, a device for outputting an audio signal, etc. These devices are mostly provided as separate units and signal patching between the devices is complicated.

FIGS. 9A and 9B illustrate examples of conventional patch screens. Specifically, FIG. 9A illustrates a screen for setting an output patch of a mixer (DSP) (see chapter 3 "Audio Connection and Patching" of Non-patent Reference 1). "MIX 1" to "MIX 16" vertically arranged at the left side of FIG. 9A denote respective channels of mix buses in the mixer. Signals of the mix buses are allocated to channels, in which black circles are set, among the channels of a card inserted in an output-side slot of the mixer. An index 901 of "SLOT OUT" represents output-side slots, "1" of index 902 represents a card inserted in a slot #1, "1" of index 903 represents a port 1 of the card. For example, a signal of MIX 1 indicated by index 904 is patched to ports 1 and 9 of the card of the slot #1.

FIG. 9B illustrates an example screen for setting an input patch of a mixer. An index 921 of "AD IN" represents an analog/digital (AD) input card and "1" of index 922 represents a port 1 of the AD input card. For example, as denoted by index 923, an input signal of the port 1 of the AD input card is patched so that it is input to an input channel CH1 of the mixer.

[Non-patent Reference 1] "CSID CONTROL SURFACE Operation Manual (Basic Operations)," Yamaha Corporation, 2002

Problems to be Solved by the Invention

When patching is performed in the above manner in a network audio system including a plurality of audio devices connected to common buses (transmission channels), there is a problem in that the system cannot be smoothly configured since the system must be configured while constantly paying attention to devices from which input/output signals are patched and buses to which input/output signals are patched. Especially, in the case of a large-scale system, the number of devices, the number of channels, and the number of buses are very large and it is very difficult to set or manage states of patching only with device names, channel numbers, or bus numbers. The management of patching using channel numbers or bus numbers also has a problem in that repatching upon emergency or the like is not smoothly performed.

SUMMARY OF THE INVENTION

Therefore, it is an object of the invention to provide a system including a plurality of audio devices connected to an audio network having a plurality of transmission channels capable of transmitting audio signals in real time, which makes it possible to easily perform patching of transmission channels of the audio network and internal channels of each audio device and also to easily perform repatching upon emergency or the like.

In order to achieve the above object, the invention provides a channel patching apparatus for a network audio system including a plurality of audio devices connected by an audio network through which audio signals can be transmitted and received by the plurality of audio devices in real time basis, the channel patching apparatus performing allocation of internal channels of each audio device and transmission channels of the audio network. The inventive channel patching apparatus comprises: an output patch setting part that assigns a name defined according to input by a user to an audio signal of an internal channel of an audio device, which outputs the audio signal to a transmission channel of the audio network, among the plurality of audio devices; a transmission channel allocation setting part that allocates a transmission channel of the audio network to the audio signal assigned the name, and that performs setting of the audio device such that the audio signal assigned the name is output from the internal channel associated with the audio signal assigned the name to the allocated transmission channel; and an input patch setting part that assigns a name that the user has selected from a list of the names assigned to the audio signals, to an internal channel of an audio device of an input side, to which an audio signal from a transmission channel of the audio network is input, among the plurality of audio devices, and that performs setting of the audio device such that an audio signal of a transmission channel corresponding to the selected name is input to the internal channel of the audio device assigned the selected name.

In an expedient form, the output patch setting part is capable of assigning the same name to different internal channels and assigns different priorities to the internal channels when the same name is assigned to the internal channels. When assigning of the different priorities has been made for the same name, the transmission channel allocation setting part allocates a transmission channel to one of the internal channels assigned the highest priority.

In this case, when an audio signal of an internal channel or a transmission channel corresponding to one name has failed to be transmitted due to malfunction, the transmission channel allocation setting part performs allocation of the inner channel and the transmission channel based on assigning of a next priority for the same name if the assigning of the next priority for the same name is present.

According to the invention, in a system including a plurality of audio devices connected to an audio network having a plurality of transmission channels capable of transmitting audio signals in real time basis, it is possible to easily perform patching of transmission channels of the audio network and internal channels of each audio device. Since patching can be performed using names assigned by a user, it is possible to easily perform patching without paying attention to device names, channel numbers, bus numbers, or the like. Since a change of a name of a channel, through which a signal is being output to a transmission bus, is automatically reflected to a name of an associated portion, any trouble to change names after patching is done is significantly reduced. In addition, when the same channel name is assigned to a plurality of channels with different priorities being set for the channels, a receiving audio device which receives a signal from a bus is set so as to patch one of the channels of a higher priority. Thus, it is possible to easily make a signal dual. In addition, when a trouble has occurred in a bus or a device of a currently patched name, it is possible to automatically re-patch a channel with the highest priority among channels having the same name as that of the currently patched channel so that the system can effectively operate even upon redundancy or emergency.

BRIEF DESCRIPTION OF THE DRAWINGS

FIG. 3 illustrates how patching is performed.

DETAILED DESCRIPTION OF THE INVENTION

Embodiments of the invention will now be described with reference to the accompanying drawings.

Figure 1:
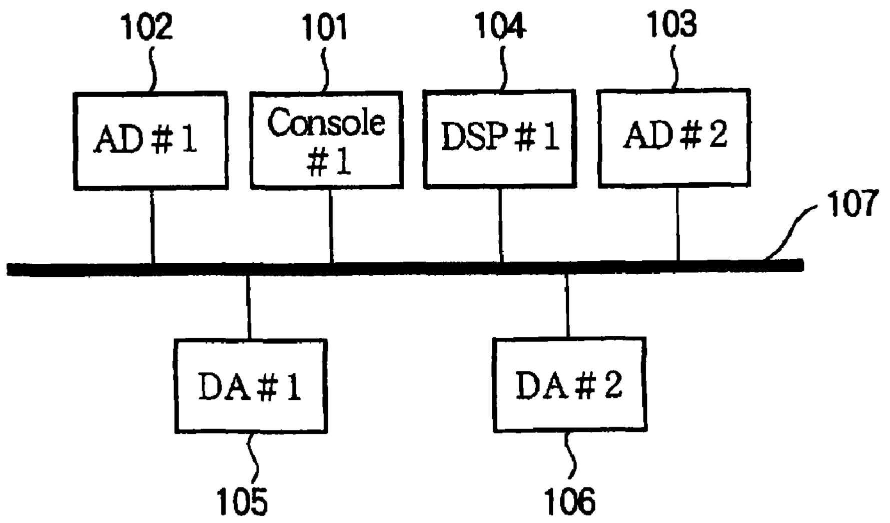
FIG. 1 illustrates an overall configuration of a network audio system to which the invention is applied.

FIG. 1 illustrates an overall configuration of a network audio system to which the invention is applied. A console 101, AD input units 102 and 103, a Digital Signal Processor (DSP) 104, and DA output units 105 and 106 are connected to an audio network (music LAN) 107 having a plurality of transmission channels (transmission buses) which can transmit audio signals in real time. Each of these devices includes a plurality of internal channels for processing audio signals in the device. For example, the AD input unit 102 includes a plurality of input channels for converting analog audio signals from a microphone or the like into digital audio signals, and inputting the digital audio signals and the console 101 includes a plurality of channels for monitoring or controlling audio signals.

The following is a typical example of patching of a transmission channel and an internal channel of each device.

(1) A signal of a port 1 (an input channel 1) of an AD input card of a slot 1 of the AD input unit 102 is allocated to a transmission channel 1 of the audio network 107.

(2) A signal of the transmission channel 1 of the audio network 107 is allocated to a channel 1 of the console 101 to monitor the signal.

(3) A signal of the transmission channel 1 of the audio network 107 is allocated to a mixing channel (MIX bus) 1 of the DSP 104 to perform mixing of the signals or impartment of effects on the signals.

(4) A signal of the mixing channel 1 of the DSP 104 is allocated to a transmission channel 2 to output the signal.

(5) A signal of the transmission channel 2 is allocated to a port 1 (output channel 1) of a DA output card of a slot 1 of the DA output unit 105 to output the signal.

In this embodiment, patching can be easily performed without paying special attention to channel numbers or the like of the console 101. Specifically, a manual operation is performed on the console 101 to display an input patch or output patch screen (described below) of each device on a display unit 208, and control pieces are operated to change setting of patching on the screen.

Figure 2:
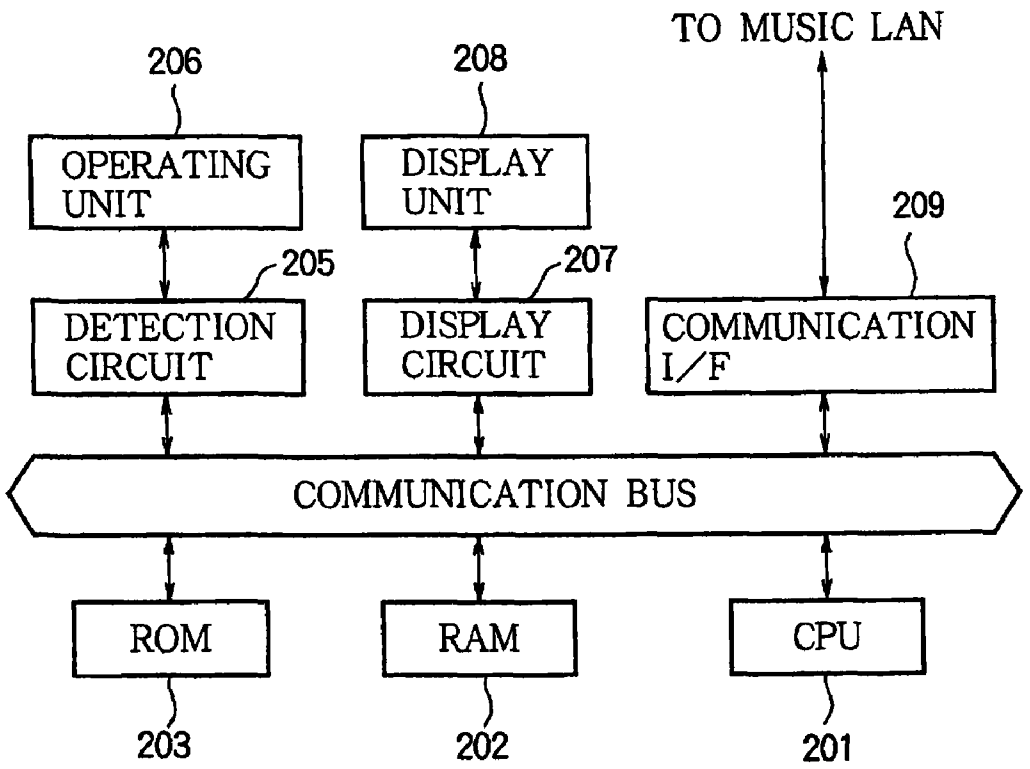
FIG. 2 illustrates a schematic diagram of a console.

FIG. 2 illustrates a schematic configuration of the console 101 of FIG. 1. The console 101 includes a Central Processing Unit (CPU) 201, a Random Access Memory (RAM) 202, a Read Only Memory (ROM) 203, a detection circuit 205, an operating unit 206, a display circuit 207, a display unit 208, and a communication interface (I/F) 209.

The CPU 201 is a processing unit for controlling the overall operation of the console. The RAM 202 is a volatile memory in which a program to be executed by the console 101 is loaded and a variety of work regions are secured. The ROM 203 is a nonvolatile memory in which a startup routine that is activated when power is supplied, a Basic Input/Output System (BIOS) that is responsible for low level I/O processes, or the like are stored. The operating unit 206 includes control pieces such as buttons, switches, knobs, and faders mounted on an external panel of the console. An operation of the operating unit 206 is detected by the detection circuit 205 and the detection result is transmitted to the CPU 201. The display unit 208 is a display mounted on the external panel to display a variety of information. The display circuit 207 displays given data on the display unit 208 based on an instruction from the CPU 201. The communication interface 209 is an interface for connection to the audio network 107.

FIG. 3 illustrates how patching is performed in this embodiment. In FIG. 3, reference numeral “301” denotes an example screen for performing output patching of the AD input unit 102. Channel fields “Out 1” to “Out 8” correspond respectively to input ports (channels) in the AD input unit 102, and an audio signal input source such as a microphone is connected to each of these ports. Name fields represent names that a user has arbitrarily assigned to the channels. Each name field is blank by default, and the user arbitrarily enters a name in a name field for a channel that is determined to be used by connecting a microphone or the like thereto. In this system, basically, unique names are set in the name fields. However, a plurality of identical names may also be set in a name field. In this case, different values are set in priority fields described below. Integer values of 0 to 10 are set in the priority fields. The value “0” corresponds to the lowest priority and the value “10” corresponds to the highest priority. When the same name is set for a plurality of channels, it is necessary to set different priority values. Check boxes of the channels, which are unchecked by default, are set in system bus fields. A transmission channel (transmission bus) of the audio network 107 is automatically allocated to each checked channel while no transmission bus is allocated to each unchecked channel. A signal of a checked channel is transmitted to a transmission bus allocated to the checked channel. When the user has entered a name in a name field, a system bus field of a corresponding channel is automatically checked and a transmission bus is allocated to the channel. When the system bus field is unchecked, the transmission bus allocated to the corresponding channel becomes a blank bus.

Reference numeral “302” denotes example bus numbers of transmission buses that have been automatically allocated. Although these bus numbers are those of transmission buses that have been automatically allocated from among blank transmission buses by the console 101 that manages patching of the transmission buses, the user is not notified of the bus numbers as internal information stored in the console 101. On the screen 301, the user enters a name of each channel and checks a system bus field to allocate the channel to a transmission bus. When a system bus field of a channel is unchecked, a bus number field corresponding to the channel is marked with “-” since no transmission bus is allocated to the channel. Information representing association between each channel and a transmission bus number allocated to the channel is transmitted from the console 101 to a corresponding device (the AD input unit 102 in this example) at an appropriate time (for example when a request to terminate setting of the output patch using the screen is issued). When this information is received, the AD input unit 102 performs internal setting so that a signal of each channel (input port) is transmitted to a transmission bus corresponding to a bus number allocated to the channel.

Reference numeral "303" denotes an example screen for performing output patching of the AD input unit 103, similar to the reference numeral "301." "304" denotes internal information representing allocation of bus numbers. The console 101 integrates the information 302 and 304 to create a mapping table 310 between names and bus numbers. Each bus number field lists all bus numbers, which have been assigned the same name, together with respective priorities. In each bus number field of the mapping table 310 shown in FIG. 3, a priority value in parentheses is written after a bus number. When a plurality of bus numbers is assigned the same name, the bus numbers are written in decreasing order of priority and are separated by commas. For example, "27(10), 28(9)" is written in a bus number field of "Vocal Main," which indicates that a bus number of "27" has been allocated with priority "10" and a bus number of "28" has been allocated with priority "9."

Reference numeral "312" denotes an example screen for performing setting of an input patch of the console (specifically, setting of allocation of a signal of each transmission bus to a corresponding internal channel of the console). "Ch1" to "Ch8" in channel fields denote internal channels (for monitoring) of the console 101. The name fields are blank by default. When this input patch setting is performed, names are read from the mapping table 310 to display a name list denoted by "311." The user can assign an arbitrary name, selected from the list 311 on the screen, to a name field of each channel of the screen 312. Accordingly, the corresponding internal channel of the console 101 is patched to a signal of the assigned name. For example, it can be seen that "MC Main" is assigned to "Ch1" and a signal of "MC Main" is input from a transmission bus corresponding to a bus number of "25" in the mapping table 310. Accordingly, mapping information 313 between the internal channels of the console 101 and the transmission bus numbers is created. When the input patch of the console 101 has been established, the console 101 performs the setting of inputting of a signal from each transmission bus number to a corresponding internal channel of the console 101 according to the internal information 313.

Although the above description has been given with reference to the output patch of the AD unit and the input patch of the console as an example, the same method is applied to other devices connected to the audio network 107 of FIG. 1. In this case, setting of the output of a signal from the device to the audio network 107 may be performed using the same setting method as the output patch described above with reference to FIG. 3, and setting of the input of a signal from the audio network 107 to the device may be performed using the same setting method as the input patch described above with reference to FIG. 3.

As described above, the user can perform patching using names arbitrarily assigned to channels and does not need to be aware of any specific bus numbers of transmission buses which are used to transmit and receive signals. Accordingly, the user can perform patching without the need to pay attention to channel numbers or bus numbers. In addition, only one name is assigned to a transmission bus and an internal channel of each device. Therefore, for example, when a name of an internal channel assigned in an output patch is changed, a name of a transmission bus and a name in an input patch is also automatically changed following the name of the internal channel. Namely, the change of the name assigned to the audio signal is automatically reflected to the corresponding ones of internal channels and transmission channels.

Figure 4:
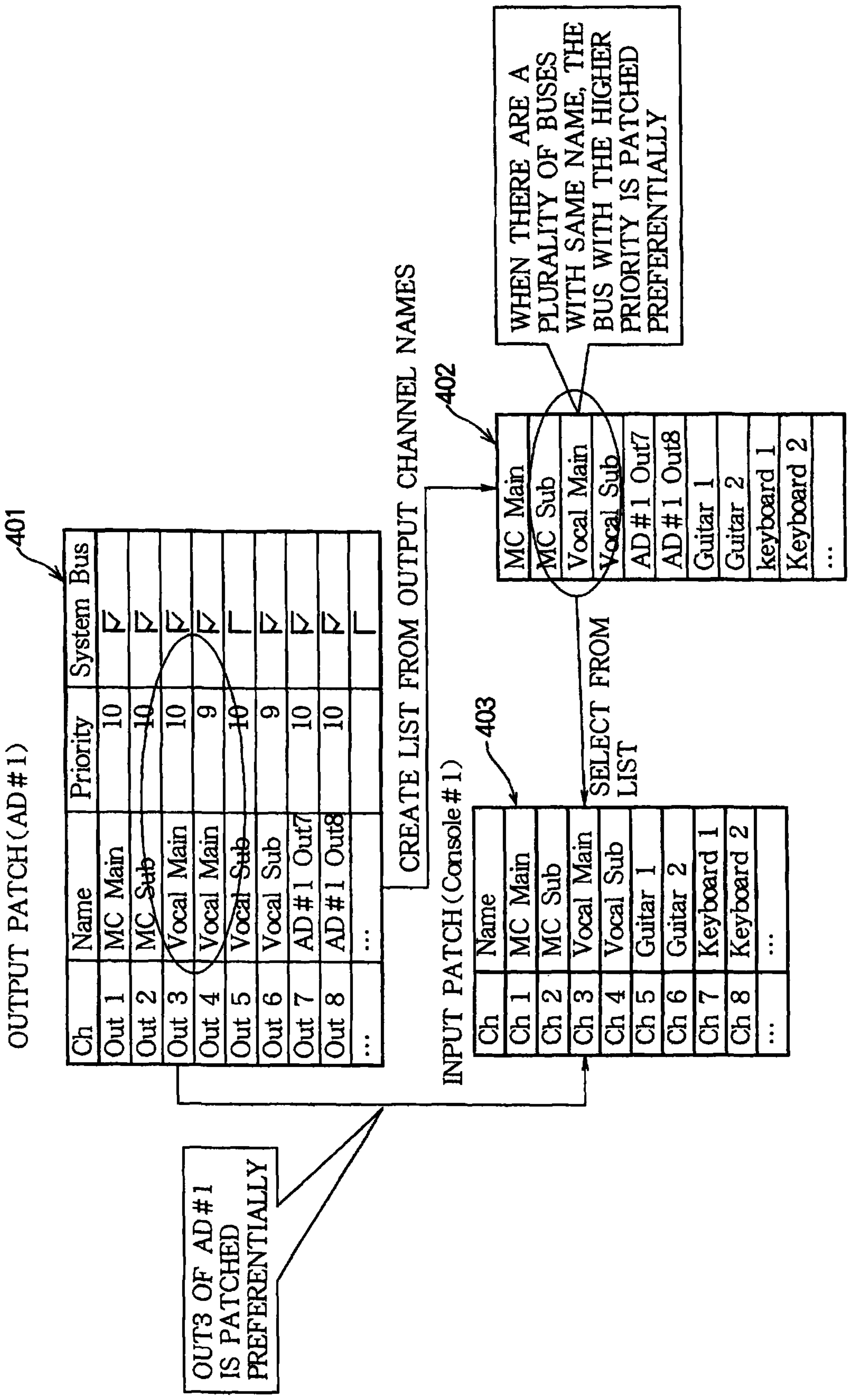
FIG. 4 illustrates priority of patching.

FIG. 4 illustrates priority of patching. As described above with reference to FIG. 3, when the same name is assigned to a plurality of signals while the priority values of the plurality of signals are different, a signal with a higher priority value is patched preferentially (i.e., first). For example, as denoted by "401," the same name "Vocal Main" has been set for the channel fields "Out 3" and "Out 4" of the AD input unit 102 and corresponding system bus fields have been checked. Accordingly, signals of "Out 3" and "Out 4" are transmitted to transmission buses allocated thereto (transmission buses of the bus numbers 27 and 28 as shown in FIG. 3). On the other hand, for example, as denoted by 402, when a name "Vocal Main" has been selected from a list in an input patch 403 of the console 101 and the selected name has been assigned to a channel 3, a signal with the higher priority value is patched preferentially. Accordingly, a signal input from the transmission bus of the bus number 27 (to which the channel field "Out 3" with priority 10 has been allocated in the output patch 301) is allocated to the channel 3 of the console 101 as can be seen from the channel 3 of the input patch 312 in FIG. 3.

Setting priorities in this manner has a variety of advantages. For example, when it is detected that a signal cannot be received from a current patching target due to some trouble, re-patching is automatically performed if an allocation of the same name with the next highest priority is present, thereby preventing the processing from being interrupted. For example, in the example of FIG. 4, when a signal cannot be received from the channel "Out 3" of the AD input unit 102, this system automatically performs allocation of the next priority (i.e., a process for re-patching to the channel "Out 4"). Therefore, there is a need to perform setting, for example, such that a signal from a microphone of the same name "Vocal Main" is output from the channels "Out 3" and "Out 4" or such that a signal of a microphone for backup, other than that of the channel "Out 3," is output from the channel "Out 4."

Figure 5A:
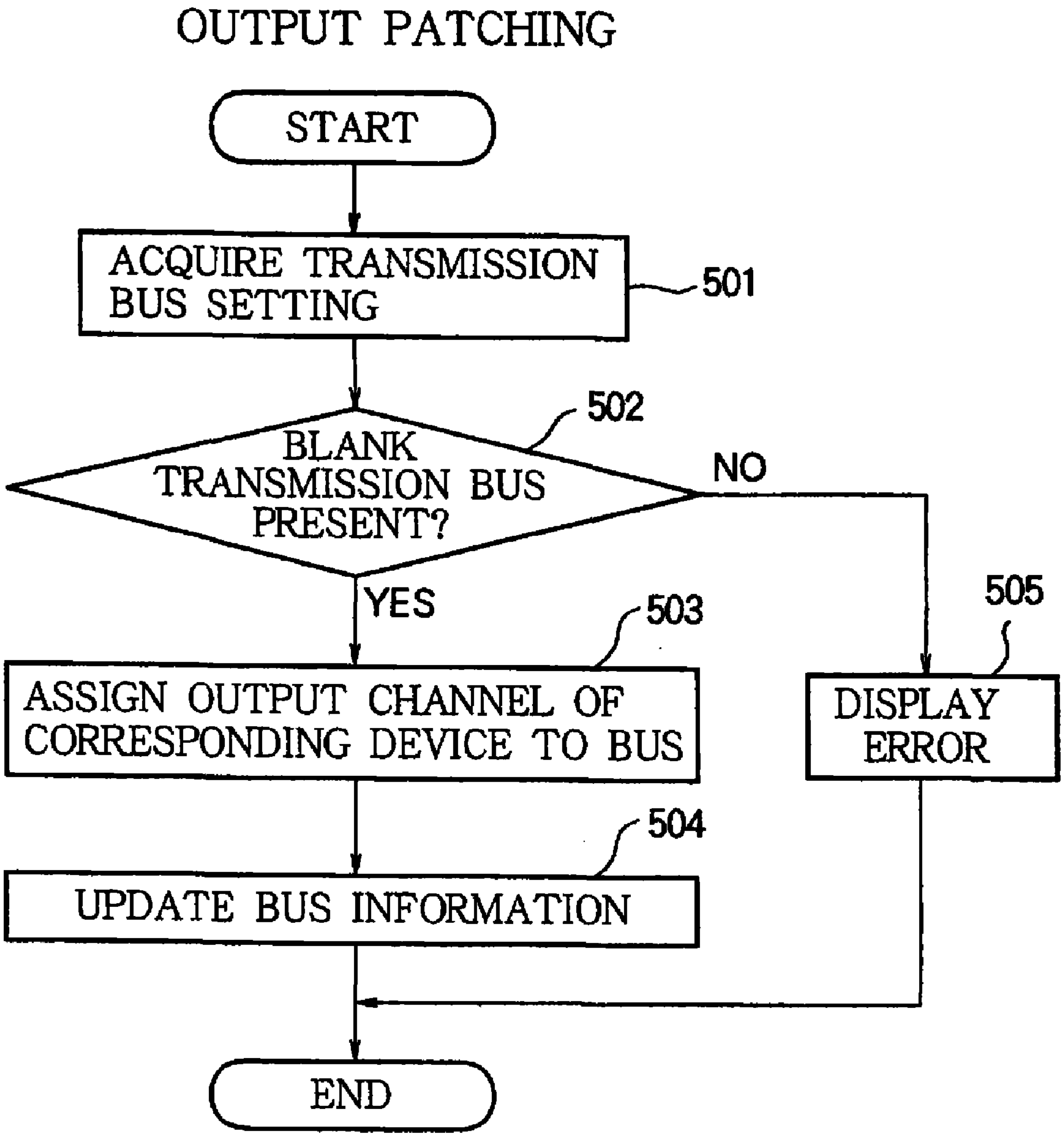
FIGS. 5A and 5B are a flow chart illustrating a procedure for setting patching.

FIG. 5A is a flow chart illustrating a procedure for setting output patching in the console 101. Here, it is assumed that a device for performing setting of output patching is specified and a screen such as the screen 301 or the screen 303 of FIG. 3 for the device is displayed. This procedure is activated when a new name is entered in a (blank) name field of an internal channel on the screen and a corresponding system bus field is automatically checked, or when a system bus field corresponding to an internal channel of a filled name field is switched from an unchecked state to a checked state. At step 501, usage states of transmission buses are acquired. When it is determined at step 502 that a blank transmission bus assigned no channel is present, the corresponding internal channel of the corresponding device is assigned to the blank transmission bus according to an instruction from a user at step 503, and information regarding transmission buses is updated at step 504 and the procedure is then terminated. When it is determined that no blank transmission bus is present, an error is displayed at step 505 and the procedure is then terminated. Step 504 is a process for updating the usage states of transmission buses such as the mapping table 310 and the internal information such as the information 302 and 304 in FIG. 3.

Figure 5B:
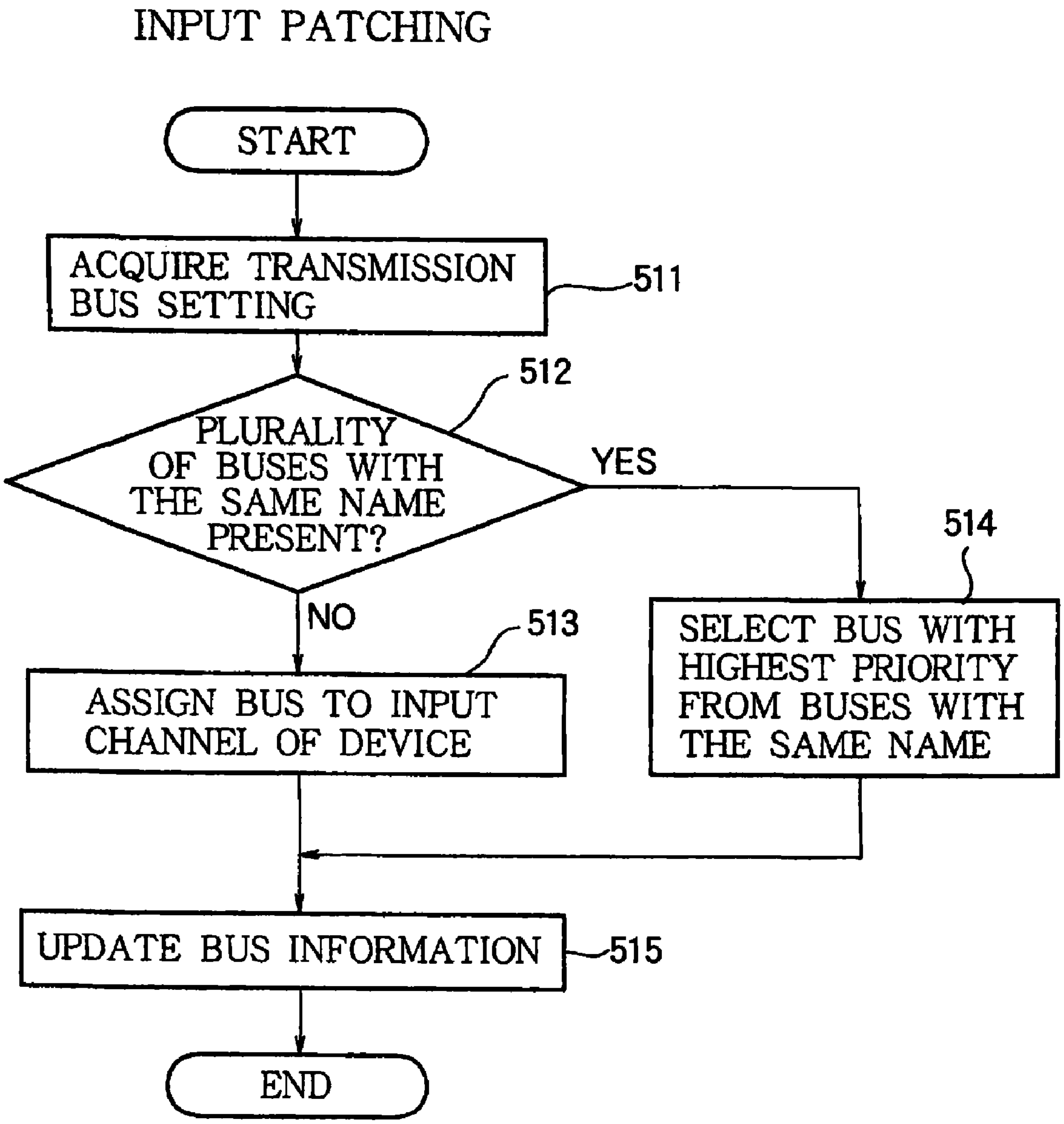

FIG. 5B is a flow chart illustrating a procedure for setting input patching in the console 101. Here, it is assumed that a device for performing setting of input patching is specified and a list 311 and a screen such as the screen 312 of FIG. 3 for the device are displayed. This procedure is activated when a name selected from the list 311 is entered in a (blank) name field of a channel on the screen. At step 511, usage states of transmission buses are acquired. At step 512, it is determined whether or not a plurality of buses with the same name is present. In this process, the mapping table 310 is searched using the name entered in the name field to check whether or not a plurality of bus numbers has been assigned. When only one bus number has been assigned, a bus having the name is assigned to an input channel of the device at step 513 and information of transmission buses is updated at step 515 and the procedure is then terminated. When a plurality of buses has been assigned, a bus with the highest priority is selected to be assigned from among the buses having the same name at step 514 and the procedure then proceeds to step 515.

Figure 6:
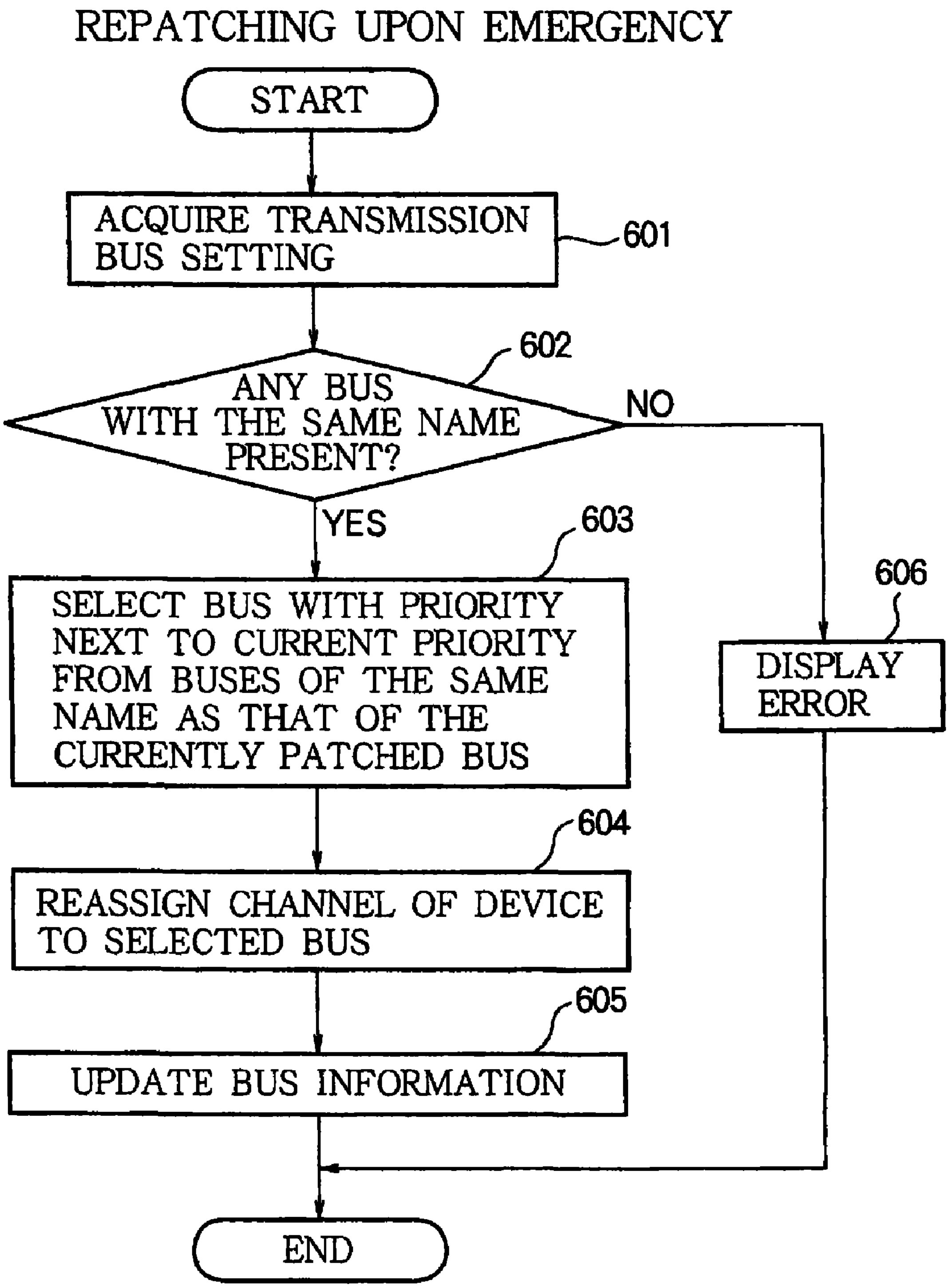
FIG. 6 is a flow chart illustrating a procedure for performing repatching when emergency occurs.

FIG. 6 is a flow chart illustrating a procedure for performing repatching when emergency occurs. This procedure is activated when a transmission bus or a channel of each device has malfunctioned. Here, it is assumed that the procedure is performed by the console 101. At step 601, setting states of transmission buses are acquired. Then, at step 602, it is determined whether or not any bus with the same name as a bus of a transmission bus number where a malfunction has occurred (or a transmission bus number corresponding to a channel of the device where a malfunction has occurred) is present. This determination can be made with reference to the mapping table 310. If any bus with the same name as the bus where a malfunction has occurred is present, a bus with the next highest priority to the current priority is selected from buses of the same name as that of the currently patched bus at step 603. A channel of the device is reassigned to the selected bus at step 604 and information of transmission buses is updated at step 605 and the procedure is then terminated. If no bus with the same name is present, an error is displayed at step 606 and the procedure is then terminated.

Figure 7:
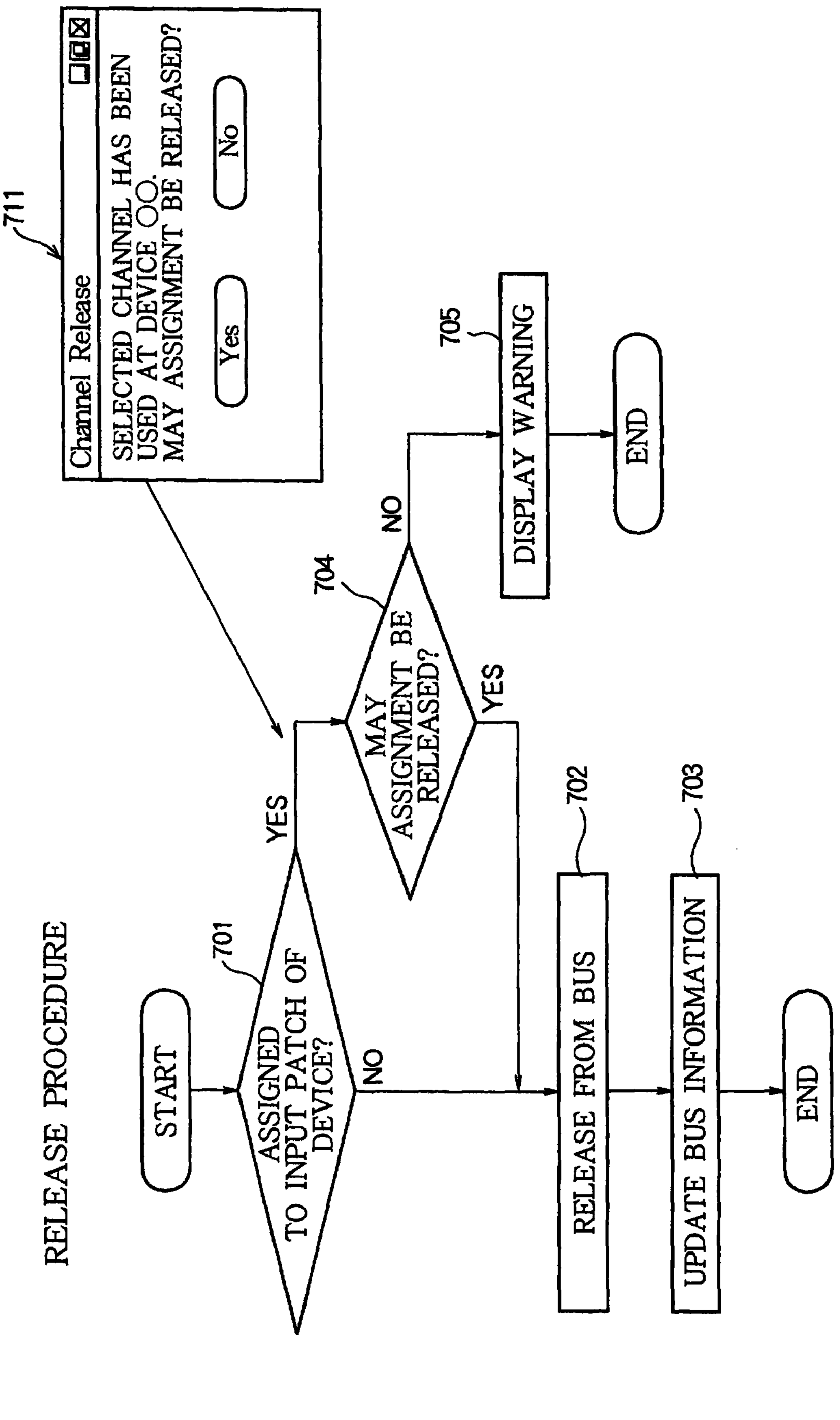
FIG. 7 is a flow chart illustrating a procedure for performing a release process.

FIG. 7 is a flow chart illustrating a release procedure performed to release a transmission bus that has been assigned. This procedure is activated when a name of a transmission bus to be released is specified from among names registered in the mapping table 310. At step 701, it is determined whether or not the name has been assigned in an input patch of a device. When the name has not been assigned, the assignment of the name to a transmission bus is released at step 702 and information of transmission buses is updated at step 703 and the procedure is then terminated. Accordingly, assignment data of the name is removed from the mapping table 310 and a patch of each device that has used a transmission bus of the name is also removed. When it is determined at step 701 that the name has been assigned, an instruction as to whether or not the assignment may be released is received from a user at step 704. If the assignment may be released, the procedure proceeds to step 702. In FIG. 7, "711" denotes an example screen displayed when the instruction is received from the user at step 704. If the assignment may not be released, a warning is displayed at step 705 and the procedure is terminated.

Figure 8:
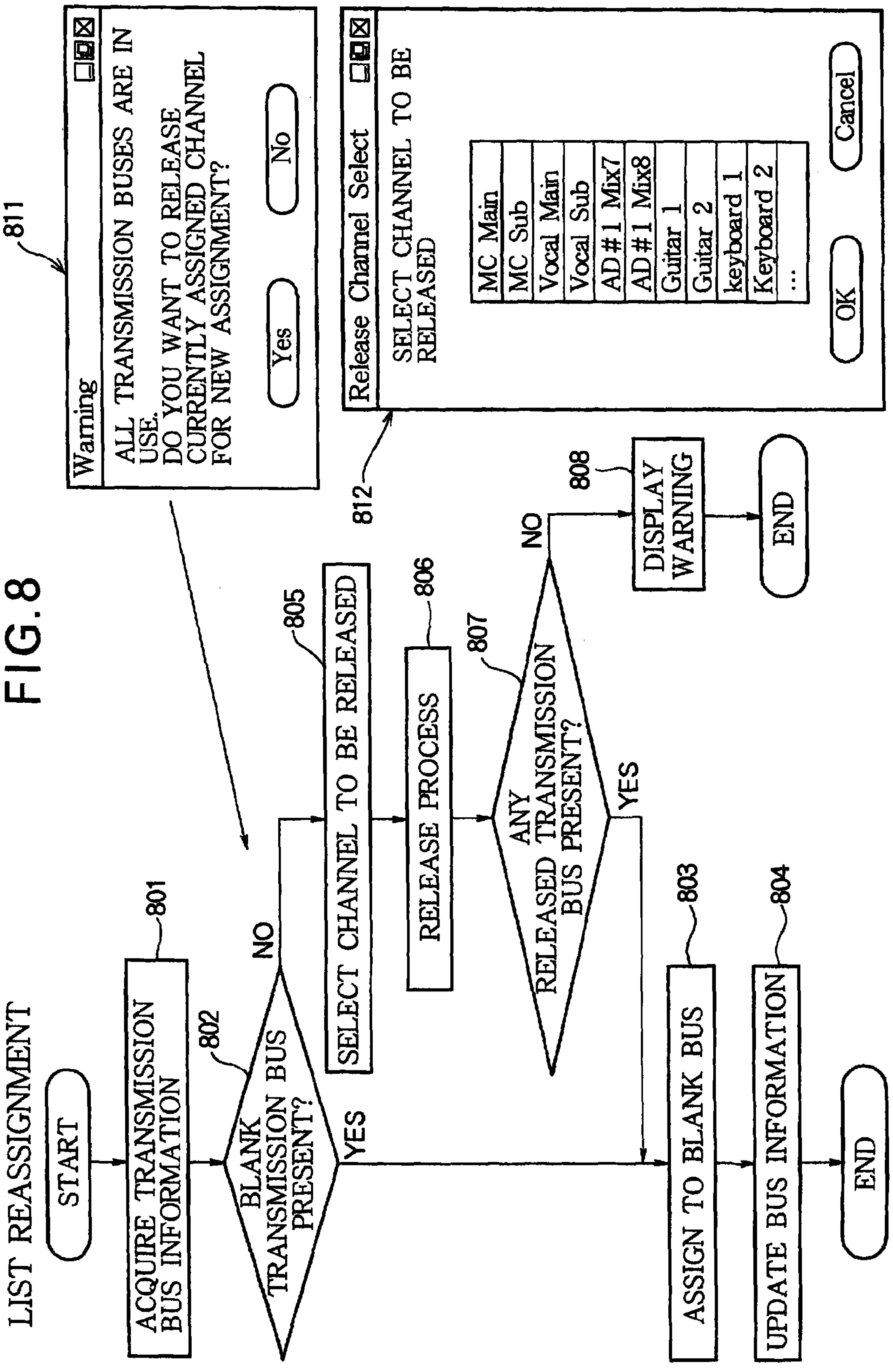
FIG. 8 is a flow chart illustrating a procedure for performing a process for reassigning a list.
Figure 9A:
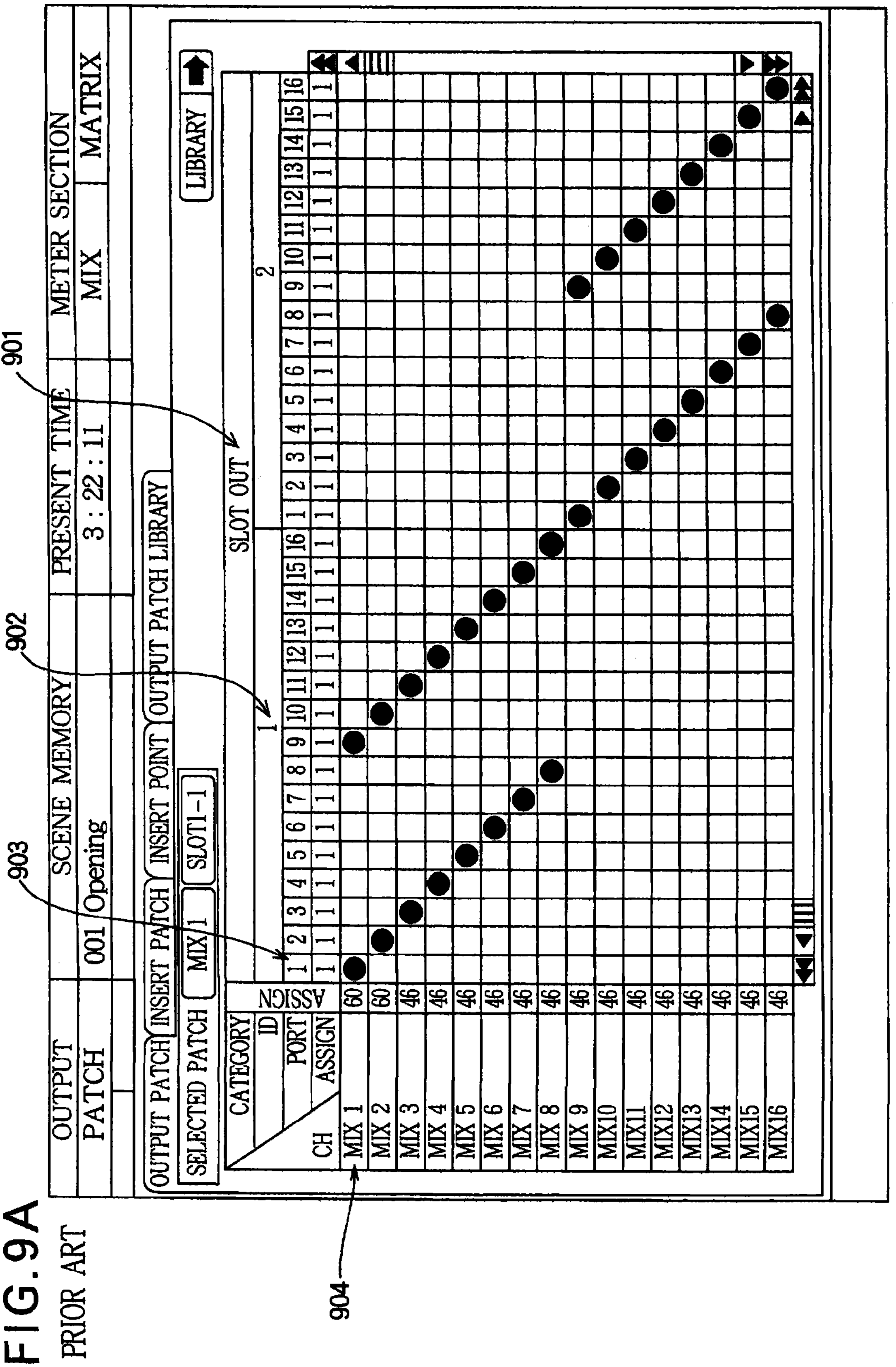
FIG. 9A PRIOR ART
FIGS. 9A and 9B illustrate examples of conventional patch screens.
Figure 9B:
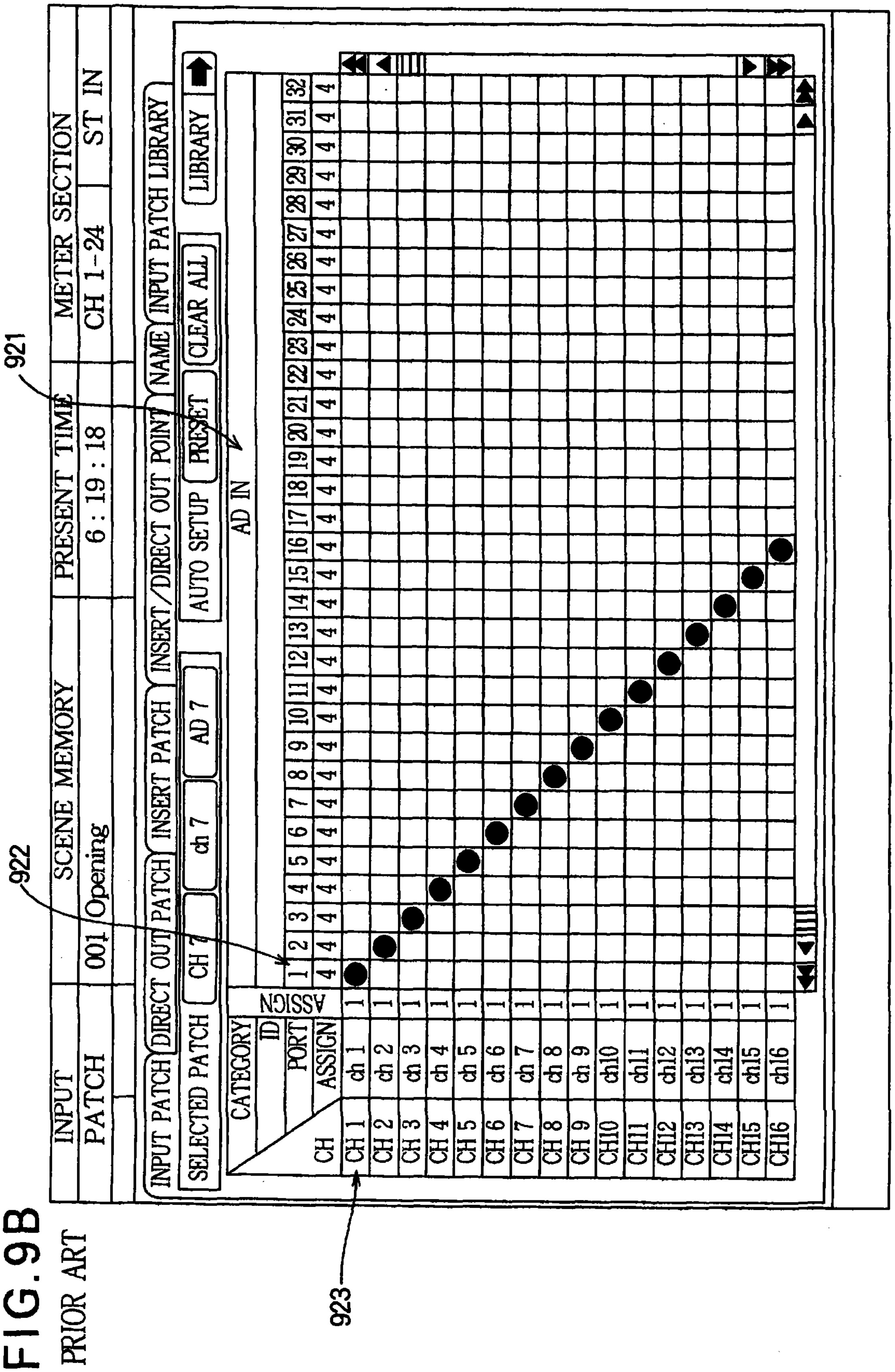
FIG. 9B PRIOR ART

FIG. 8 is a flow chart illustrating a procedure for reassigning a list. This procedure is an example replacement of the procedure of FIG. 5A. In the procedure of FIG. 5A, an error is displayed when no blank transmission bus is present. However, in the procedure of FIG. 8, the user is prompted to select a transmission channel that may be released and assignment is made to the selected transmission channel. A description of steps 801 to 804 is omitted herein since steps 801 to 804 correspond respectively to the above steps 501 to 504 of FIG. 5A. When it is determined at step 802 that no blank transmission bus is present, a screen 811 is displayed to ask the user whether or not to release a currently assigned transmission channel to create a blank transmission channel. When "Yes" is selected, at step 805, a screen 812 is displayed to prompt the user to select a transmission channel to be released. A list displayed on the screen 812 is a list of names that have been registered in the mapping table 310 at that time (i.e., a list of names to which transmission channels have been allocated). When the user selects a transmission channel to be released on this screen, the selected transmission channel is released at step 806 (i.e., assignment of the transmission channel is released to create a blank channel). Then, at step 807, it is determined whether or not any released channel is present. If any released channel is present, the procedure proceeds to step 803, otherwise a warning is displayed at step 808 and the procedure is then terminated.

The invention claimed is:

1. A channel patching apparatus, for a network audio system including a plurality of audio devices each connected by an audio network through which audio signals are transmittable between the plurality of audio devices in real time basis, for allocating internal channels of each audio device and transmission channels of the audio network, the channel patching apparatus comprising:

a controller configured to provide:

an output patch setting that assigns a name defined according to input by a user to an audio signal of one of the internal channels of a first audio device among the plurality of audio devices, which first audio device outputs the audio signal to one of the transmission channels of the audio network;

a transmission channel allocation setting part that allocates one transmission channel among the transmission channels of the audio network to the name-assigned audio signal, and that sets the first audio device so that the name-assigned audio signal is output from the one internal channel associated with the name-assigned audio signal to the allocated one transmission channel; and an input patch setting that assigns a name, which is selectable by the user from a list of the names assigned to the respective audio signals, to one of the internal channels of a second audio device among the plurality of audio devices, to which the audio signal transmitted via the allocated one transmission channel of the audio network is input, and that sets the second audio device so that the audio signal of the assigned one transmission channel corresponding to the name selected from the list of the names is input to the one internal channel of the second audio device.

2. The channel patching apparatus according to claim 1, wherein:

the output patch setting assigns the same name to different internal channels of the first audio device and assigns different priorities to the different internal channels of the first audio device when the same name is assigned to the different internal channels of the first audio device, and when the different priorities have been assigned to the different channels of the first audio device assigned with the same name, the transmission channel allocation setting allocates a transmission channel among the transmission channels to an internal channel among the internal channels assigned with a highest priority.

3. The channel patching apparatus according to claim 2, wherein, when the audio signal of an internal channel or a transmission channel assigned to one name is not transmitted due to malfunction, the transmission channel allocation setting allocates the internal channel and the transmission channel based on assigning of a next priority for the same name if the assigning of the next priority for the same name is present.

* * * * *